United States Patent [19]

Mori et al.

[11] Patent Number: 4,585,125
[45] Date of Patent: Apr. 29, 1986

[54] BILL DISCRIMINATOR

[75] Inventors: Yoshikazu Mori; Susumu Kojima; Masayuki Watabe, all of Tokyo, Japan

[73] Assignee: Kabushiki Kaisha Nipponcoinco, Tokyo, Japan

[21] Appl. No.: 726,128

[22] Filed: Apr. 23, 1985

[30] Foreign Application Priority Data

Jun. 15, 1984 [JP] Japan .............................. 59-88108[U]

[51] Int. Cl.$^4$ ............................................... B07C 5/00
[52] U.S. Cl. ....................................... 209/534; 271/902
[58] Field of Search ..................... 209/534, 569; 271/3, 271/902, 184, 225

[56] References Cited

U.S. PATENT DOCUMENTS 3,715,031 2/1973 Okkonen .............................. 209/534
3,924,847 12/1975 Pescetto ........................... 209/534 X Primary Examiner—Richard A. Schacher
Attorney, Agent, or Firm—Koda and Androlia

[57] ABSTRACT

A bill discriminator including within a housing a bill conveying mechanism which comprises a bill conveying path, a driving pulley, a driven pulley and conveyor belt and which is rotatable in both forward and reverse directions for conveyance of a bill within the bill conveying path, and bill discriminating magnetic head and photo sensors disposed in the bill conveying path, characterized by further including a tiltable lever having a pressing roller which is brought into pressure contact with the magnetic head by a biasing force of a spring, a latch gear integral with the driven pulley of the bill conveying mechanism, and a rocking lever which is normally in pressure contact with the outer periphery of the latch gear and which, at the time of reverse rotation of the bill conveying mechanism, imparts a tilting action to the tiltable lever against the spring to let the pressing roller depart from the magnetic head.

1 Claim, 4 Drawing Figures

BILL DISCRIMINATOR

BACKGROUND OF THE INVENTION

1. Field of the Invention

The present invention relates to a bill (paper money) discriminator for use in vending machines, exchange machines, etc. More particularly, it is concerned with a structure in which a magnetic head is brought into pressure contact with a bill for discrimination of the bill and the pressure contact of the magnetic head with the bill is released for return of the bill to prevent it from causing clogging.

2. Description of the Prior Art

The applicant of the present invention has previously proposed a device (see Japanese Utility Model Application No. 153262/1982) in which a pressure contact of a pressing roller with a magnetic head is released at the time of reverse feed by means of an arm which is in engagement with a bill conveying timing belt.

However, the above mechanism utilizing the engagement of a timing belt with an arm is disadvantageous in that in the event of occurrence of slack or vibration of the timing belt, not only a satisfactory function cannot be performed, but also the timing belt may be damaged and impair its durability.

SUMMARY OF THE INVENTION

It is the object of the present invention to remedy the above-mentioned drawbacks, and the gist of the present invention resides in a bill discriminator including within a housing a guide plate which constitutes a bill conveying path, a driving pulley disposed so that its peripheral edge faces the bill conveying path, a plurality of driven pulleys, a conveyor belt stretched between the pulleys, and a bill discriminating magnetic head or photo sensor disposed in the bill conveying path, characterized by further including a roller which is brought into pressure contact with the magnetic head by means of a spring, a rocker arm which pivotally supports the roller, a latch wheel fixed to a rotational shaft of a driven pulley and adapted to rotate together with the driven pulley, and a pivoting piece adapted to engage the latch wheel at the time of reverse feed of the conveyor belt and pivot against the bias of the spring, in which the pressure contact of the roller with the magnetic head is released at the time of conveyance by engagement of a pawl formed at the fore end of the pivoting piece with the rocker arm.

BRIEF DESCRIPTION OF THE DRAWINGS

The drawings illustrate an embodiment of the present invention, in which.

DESCRIPTION OF A PREFERRED EMBODIMENT

Figure 1:
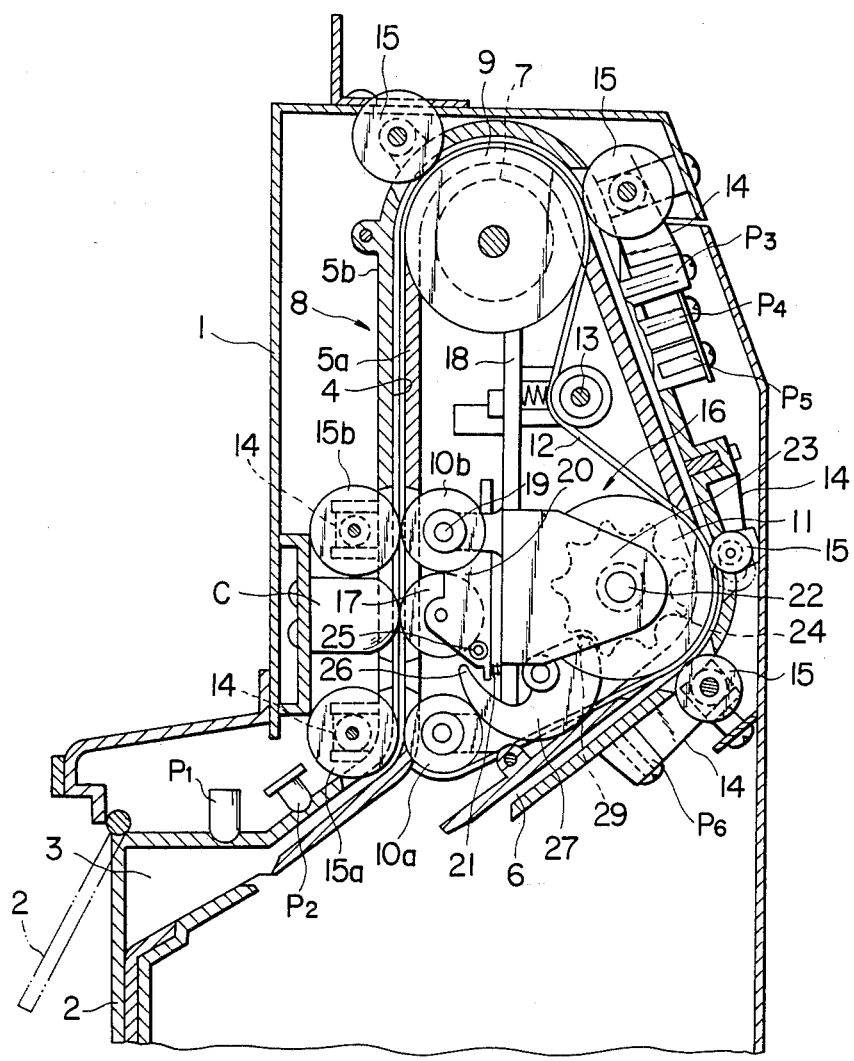
FIG. 1 is a longitudinal sectional view of the whole of a bill discriminator according to an embodiment of the present invention.

Referring first to FIG. 1, there is illustrated in longitudinal section the whole of a bill (paper money) discriminator embodying the invention, in which the reference numeral 1 denotes a housing provided with a bill inlet port having an openable cover 2 in the front face, and the numeral 4 denotes an inverted U-shaped bill conveying path which is defined by a pair of inner and outer guide plates 5a and 5b disposed within the housing 1 and which communicates with the bill inlet port 3 of the housing 1. The lower end of the conveyance path 4 is open in a lower portion of the housing 1 to form an outlet port 6. A plurality of bill discriminating photo sensors P1 to P6 and magnetic head C are disposed in predetermined positions in the conveyance path, of which the photo sensor P1 positioned in the bill inlet port 3 detects the insertion of a bill and operates a later-described reversible motor 7 in a forward direction.

Figure 2:
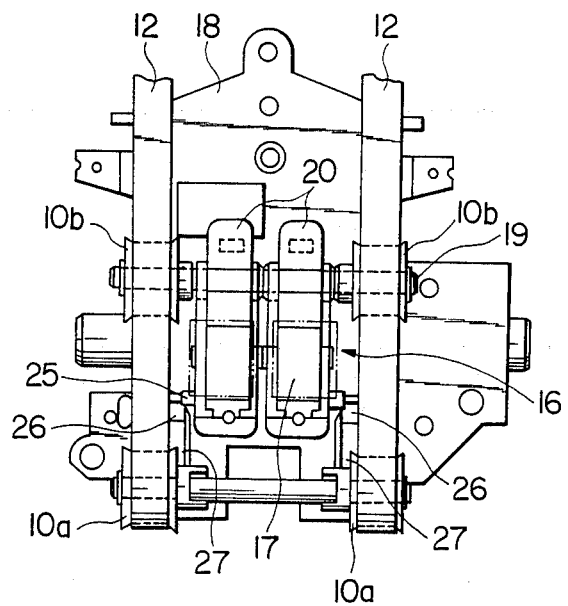
FIG. 2 is a front view of a principal portion.

The numeral 8 denotes a bill conveying mechanism which comprises a driving pulley 9 of a large diameter disposed in an upper bent position of the inner guide plate 5a and connected to the reversible motor 7; driven pulleys 10a and 10b of a small diameter and a driven pulley 11 of a large diameter which are disposed in lower front and rear positions opposed to the driving pulley 9; an endless conveyor belt 12 entrained about the pulleys 9, 10 and 11; a tension roller 13 which is disposed between the pulleys 9 and 11 and which is in elastic pressure contact with the conveyor belt 12; and pressure rollers 15 which are disposed in positions opposed to the pulleys 9, 10a, 10b and 11 which are held in moderate pressure contact with the conveyor belt 12 by means of springs 14. The bill conveying mechanism 8 is disposed in right and left positions as shown in FIG. 2. A bill once introduced from the inlet port 6 is immediately conducted to the conveyance path 4 by both the driven pulley 10a positioned at an inlet portion of the conveyance path 4 and a pressure roller 15a which is in pressure contact with the driven pulley 10a through the conveyor belt 12.

The reference mark C denotes a bill discriminating magnetic head which is positioned between the pressure rollers 15a and 15b opposed respectively to the driven pulleys 10a and 10b and which extends over the conveyance path 4.

The numeral 16 denotes a bill pressing mechanism having a pressing roller 17 adapted to come into pressure contact with the magnetic head C at the time of forward feed of the bill conveying mechanism 8 and depart from the head C at the time of reverse feed of the same mechanism. The bill pressing mechanism 16 comprises a pair of tilting levers 20 which are pivotally mounted by a pivot shaft 19 at upper ends thereof at an intermediate front portion of a base plate 18 erected inside the conveyance path 4 within the housing 1 and which support the pressing roller 17 pivotally at a lower front position, the pivot shaft 19 supporting the paired right and left driven pulleys 10b pivotally. The paired tilting levers 20 are each normally urged toward the magnetic head C by means of a spring 21 disposed between a lower end portion of the lever and the base plate 18. At an intermediate back portion of the base plate 18 is provided a bearing plate 23 which supports both ends of a rotational shaft 22 common to both right and left driven pulleys 11 of a large diameter. A latch gear 24 is mounted centrally on the rotational shaft 22. In lower back positions of the base plate 18 are pivotably mounted a pair of right and left plate-like rocking levers 27. The rocking levers 27 are bent upwardly toward front end portions to form pawl portions at the respective front ends which are adapted to come into engagement with engaging pins 25 projecting from lower side portions of the tilting levers 20. Between rear end portions of the paired right and left rocking levers 27 is disposed an engaging rod 29 which is normally held in pressure contact with the outer peripheral surface of the latch gear 24 by means of a spring 28. The engaging rod 29 normally engages a root portion of the latch gear 24, and with rotation of the rocking levers 27, the engaging rod 29 comes into intermittent engagement with root portions of the latch gear 24.

Figure 3:
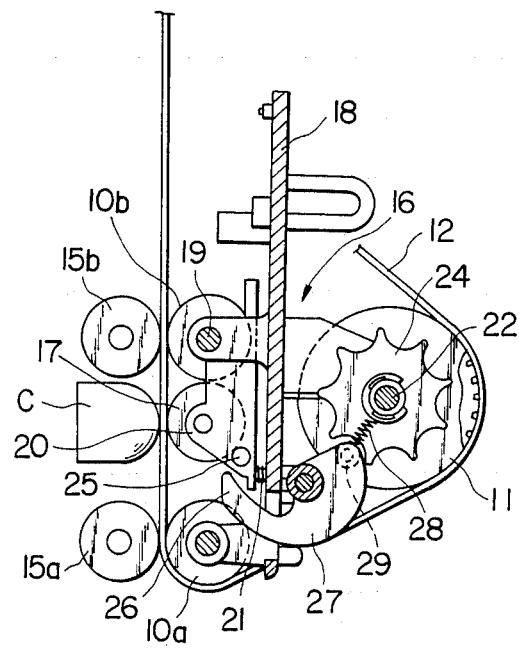
FIG. 3 is a longitudinal sectional view of the principal portion.
Figure 4:
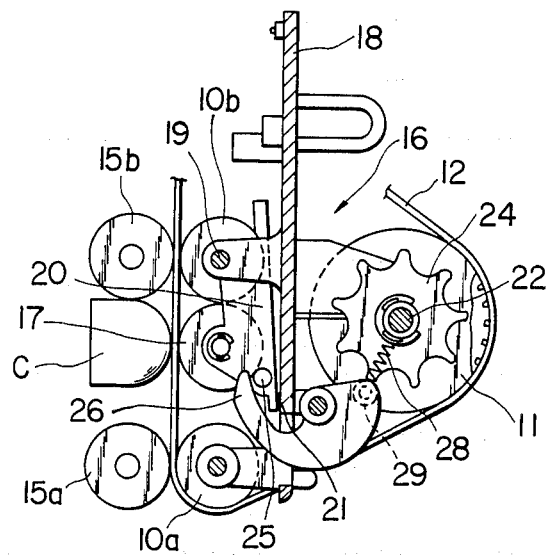
FIG. 4 is a view similar to FIG. 3 with a pawl of a rocking lever engaged with an engaging pin of a tilting lever.

With the above arrangement, when a bill is inserted from the bill inlet port 3, the driving motor 7 rotates in the forward direction upon operation of the sensor P1 in the inlet port 3, so that the bill is conveyed through the conveyance path 4 by means of the conveyance mechanism 8 and discriminated by the sensors P2 to P6 and the magnetic head C. If the bill is a regular bill, it passes through the conveyance path 4 and is discharged to the lower portion of the housing 1 from the outlet port 6. In this case, since the latch gear 24 rotates in a clockwise direction together with the driven pulleys 11, the rocking levers 27 pivot in a counterclockwise direction in FIG. 3, so there will be no engagement of the pawl portions 26 with the engaging pins 25. In the event the bill is a false bill, this is detected by a photo sensor closer to the outlet port 6 than the magnetic head C, e.g. P5, whereupon the driven motor 7 rotates in the reverse direction, so that the false bill is moved back through the conveyance path 4 and is discharged to the exterior from the inlet port 3. In this case, the latch gear 24 rotates counterclockwise in FIG. 3 together with the driven pulleys 11, so that the rocking levers 27 pivot clockwise intermittently upon engagement of the engaging rod 29 with the latch gear 24. At this instant, the pawl portions 26 come into engagement with the engaging pins 25 as shown in FIG. 4, so that the tilting levers 20 tilt against the springs 21, thus causing the pressing roller 17 to depart from the magnetic head C.

In the present invention having the above construction, as compared with the conventional construction utilizing a timing belt, not only the operation is sure but also there is no fear of damage of the conveyor belt, whose durability is therefore ensured.

What is claimed is:

1. A bill discriminator including within a housing a bill conveying mechanism which comprises a bill conveying path, a driving pulley, a driven pulley and a conveyor belt and which is rotatable in both forward and reverse directions for conveyance of a bill within said bill conveying path, and bill discriminating magnetic head and photo sensors disposed in said bill conveying path, characterized by further including a tiltable lever having a pressing roller which is brought into pressure contact with said magnetic head by a biasing force of a spring, a latch gear integral with the driven pulley of said bill conveying mechanism, and a rocking lever which is normally in pressure contact with the outer periphery of said latch gear and which, at the time of reverse rotation of said bill conveying mechanism, imparts a tilting action to said tiltable lever against the spring to let the pressing roller depart from said magnetic head.

* * * * *